United States Patent [19]

Schinkel et al.

[11] Patent Number: 4,666,772

[45] Date of Patent: May 19, 1987

[54] OPAQUE, HEAT SEALABLE MULTILAYER POLYOLEFIN FILMS

[75] Inventors: Ingo Schinkel, Walsrode; Jürgen Böhner, Bomlitz, both of Fed. Rep. of Germany

[73] Assignee: Wolff Walsrode Aktiengesellschaft, Walsrode, Fed. Rep. of Germany

[21] Appl. No.: 861,773

[22] Filed: May 9, 1986

[30] Foreign Application Priority Data

May 11, 1985 [DE] Fed. Rep. of Germany ....... 3517081

[51] Int. Cl.$^4$ .................... B32B 5/16; B32B 27/00
[52] U.S. Cl. .................................. 428/330; 428/327; 428/347; 428/348; 428/349; 428/447; 428/451; 428/515; 428/516; 428/910
[58] Field of Search .............. 428/347, 348, 330, 910, 428/515, 516, 451, 349, 327, 447

[56] References Cited

U.S. PATENT DOCUMENTS

| | | | |
|---|---|---|---|
| 3,436,246 | 4/1969 | Williams, Jr. et al. | 428/348 |
| 3,645,992 | 2/1972 | Elston | 526/96 |
| 4,011,382 | 3/1977 | Levine et al. | 526/96 |
| 4,230,767 | 10/1980 | Isaka et al. | 428/349 |
| 4,256,784 | 3/1981 | Gebhardt et al. | 428/516 |
| 4,293,608 | 10/1981 | Isaka et al. | 428/349 |
| 4,294,889 | 10/1981 | Hashimoto | 428/910 |
| 4,303,708 | 12/1981 | Gebhardt et al. | 428/347 |
| 4,390,385 | 6/1983 | Ferguson et al. | 428/910 |
| 4,393,115 | 7/1983 | Yoshii et al. | 428/910 |
| 4,421,823 | 12/1983 | Theisen et al. | 428/349 |
| 4,502,263 | 3/1985 | Crass et al. | 428/451 |
| 4,590,125 | 5/1986 | Balloni et al. | 428/347 |
| 4,595,625 | 6/1986 | Crass et al. | 428/347 |

FOREIGN PATENT DOCUMENTS 4633  3/1979  European Pat. Off. ............ 428/347

Primary Examiner—Marion C. McCamish
Assistant Examiner—Sharon A. Gibson
Attorney, Agent, or Firm—Sprung Horn Kramer & Woods

[57] ABSTRACT

Heatsealable opaque multilayer films, particularly wrapping films, having a high sealing strength, at low sealing temperature, favorable optical properties and machine compatibility based on a film of a propylene polymer and a linear statistical ethylene copolymer of low density as the heat sealing layer.

10 Claims, No Drawings

OPAQUE, HEAT SEALABLE MULTILAYER POLYOLEFIN FILMS

This invention relates to opaque, heat sealable, oriented muliple polyolefin films, which are particularly suitable as wrapping films.

Opaque multiple-layer films of polyolefins, more especially of a polypropylene base layer and a heat-sealable layer of propyethylene copolymers, are known from DE-AS No. 2 814 311.

These films have the disadvantage that they only form sufficiently strong sealing seams at temperatures above 125° C., so that the quality of foods, in particular confectionery, wrapped in the film may be adversely affected. In addition, it is not possible with these multilayer films to achieve sufficiently high packaging speeds in automatic packaging machines.

Accordingly, an object of the present invention is to provide opaque heat-sealable multilayer films, particularly packaging films, having a high sealing strength at low sealing temperature, which show particularly favourable optical properties, such as gloss, and compatibility with conventional packaging machines of various types.

According to the present invention this object is achieved by the provision of an opaque, heat sealable multilayer film consisting of a biaxially oriented base layer of propylene polymers containing from 3 to 15%, by weight, preferably from 8 to 12%, by weight of additives incompatible with the propylene polymer and of at least one heat sealable at least monoaxially oriented layer of a combination of:

(a) from 66.5 to 94.5%, by weight, preferably from 78 to 89.1%, by weight, of a linear, statistical low-density ethylene copolymer (LLDPE);

(b) from 5 to 30%, by weight, preferably from 10 to 20%, by weight, of a low molecular weight resin compatible with the LLDPE with the exception of a low molecular weight resin of a α-olefins containing at most 3 carbon atoms, such as for example a low molecular weight polyethylene or polypropylene;

(c) from 0.3 to 2%, by weight, preferably from 0.5 to 1%, by weight, of a mixture of a polyethylene wax and an oxazoline wax;

(d) from 0.2 to 1.5%, by weight, preferably from 0.4 to 1%, by weight, of polydiorganosiloxane; and (e) optionally conventional additives and auxiliaries, wherein the sum of the components from (a) to (d) always amounts to 100% by weight.

The polymer which forms the base layer of the sealable multilayer film according to the present invention is a propylene polymer containing up to at most 10%, by weight, of another α-olefin containing at most 8 carbon atoms, preferably ethylene. An isotactic polypropylene having a density of from 0.9 to 0.91 g/cm$^3$ and a melt flow index of from 1 to 4 g/10 mins. at 230° C./21.6N (according DIN 53735) is preferably used.

The base layer contains from 3 to 15%, by weight, preferably from 8 to 12%, by weight, of additives incompatible with the propylene polymers, preferably an inorganic additive, such as $CaCO_3$, $SiO_2$, Na-Al silicate and/or $TiO_2$, which additives should have an average particle size from 0,2 to 20 μm, preferable from 2 to 8 μm.

However, the base layer may also contain an organic incompatible additive, preferably polystyrene, polymethylmethacrylate, polytetrafluoroethylene and/or copolymers of such compounds having the above mentioned particle size.

In the context of the present invention, "incompatible" means that polymeric additives of the type in question have a different melting point and/or a different stretching ratio than the propylene polymer and that, in the stretching process, the polymer matrix is torn open, resulting in vacuole formation, as in cases where inorganic additives are used.

The main constituent of the heat sealable layer is a predominately linear statistical low-density ethylene copolymer of ethylene with up to 12 mole %, preferably from 2 to 8 mole %, of $C_3$-$C_{10}$ α-olefins, preferably propylene 1-butene, pentene, hexene, octene, nonene, decene or 4-methyl-1-pentene, more preferably 1-butene, hexene or octene, the copolymers are obtained under polymerization conditions which normally lead to high-density polyethylene, i.e. low pressures and temperatures and in the presence of organometallic catalysts. Processes for the production of linear low-density ethylene copolymers are described in U.S. Pat. Nos. 3,645,992 and 4,011,382. The ethylene copolymers used in accordance with the present invention should have a density below 0.94, preferably from 0.900 to 0.925, more preferably from 0.903 to 0.915, g/cm$^3$.

Natural or synthetic resins having a softening point of from 60° to 80° C., preferably from 80° to 100° C., are used as the low molecular weight resins compatible with the LLDPE. Compatible resins may be regarded as resins which may be added to the sealing layer in a concentration of up to 30%, by weight, without deterioration in the optical properties of the film. Rosin, dammar resins, turpentine resins, hydrocarbon resins, ketone resins, phenolic resins, chlorinated aliphatic or aromatic hydrocarbon resins may be used as the compatible resins. These resins are described in Ullmanns Encyclopädie der technischen Chemie, Vol. 12, 1976, p. 525 to 555.

Examples of the natural resins are rosin and dammar resins. Rosin is obtained by distilling off turpentine oil from the resins of pines or root stocks. In the context of the present invention, rosin is also to be understood to include rosin esters and also modified rosin, such as dehydrogenated odr fractionated rosin.

Dammar resins are also natural resins in the form of colourless to yellow materials which are also obtained by natural resin exudation.

Hydrocarbon resins are polymers of carbon and hydrogen which are obtained in the distillation of coal tar during the cracking of naphtha or gas oil from coke-oven gas or from turpentene oil. Typical examples of such resins are coumarone resins, petroleum resins, terpene resins, styrene resins, cylopentadiene resins.

Coumarone resins are to be understood to be hydrocarbon resins which are obtained from coke-oven gas or by polymerization of resin-forming compounds of the type encountered in coal tar distillation processes, phenolmodified coumarone resins being obtained by copolymerization.

The raw material base from which the petroleum resins are produced is obtained in the cracking of naphtha or gas oil. Resin-forming compounds are inter alia butene, butadiene, pentene, piperylene, isoprene, cyclopentadiene, dicyclopentadiene, alkyl benzenes, methyl dicyclopentadiene, methyl indene, naphthalene styrene indene, vinyl toluene, methyl styrene.

Low molecular weight homopolymers of styrene and other copolymers, such as α-methyl styrene, vinyl toluene and butadiene, are also suitable low molecular weight resins.

The cyclopentadiene resins are obtained from coal tar distillates and the petroleum gases separated. The polymers are obtained by prolonged exposure of the unsaturated compounds to high temperatures.

The terpene resins are obtained by polymerization of terpenes, such as β-pinene, α-pinene, dipentene, limonene, myncene, bornylene, caphene and similar terpenes.

The chlorinated aliphatic or aromatic hydrocarbons generally contain from 30 to 70%, by weight, of chlorine and are known as chlorine waxes or are derived from biphenyl chloride, terphenyl or mixtures thereof.

The hydrocarbon resins mentioned may also be used in the form of modified products, in which case modification is possible by copolymerization with certain monomers or by reaction with other polymers, but especially by hydrogenation or partial hydrogenation of the unsaturated constituents of the resins. Especially useful are hydrogenated hydrocarbon resins based on cyclopentadiene.

Phenolic resins of the type obtained by reaction of phenols and aldehydes are also suitable. In addition to phenol, cresol, xylenol, paraphenylphenol may be condensed with formaldehyde, furfuryl aldehyde or acetaldehyde.

The heat sealable layer contains as component (c) a mixture of a polyethylene wax and an oxazoline wax prepared from stearic acid and an amino alcohol. Trishydroxymethylaminomethane is preferable used as the amino alcohol. The ratio in which the two components are mixed may be varied over a wide range, although they are preferably mixed in a weight ratio of 1:1.

In addition, the sealable layer contains polydiorganosiloxanes or mixtures thereof which generally have a kinematic viscosity at 25° C. of at least 100 mm$^2$/second. Suitable polydiorganosiloxanes are polydialkylsiloxanes, polyalkylphenylsiloxanes, olefin-modified siloxane oils, polyether-modified siloxane oils, olefin/polyether-modified silicone oils, epoxy-modified silicone oils and alcohol-modified silicone oils, polydialkylsiloxanes preferably containing from 1 to 4 carbon atoms in the alkyl group; polydimethylsiloxane is particularly suitable. The polydiorganosiloxanes should preferably have a kinematic viscosity at 25° C. of at least $10^5$ mm$^2$/second, preferably at least $10^6$ mm$^2$/second.

The layers may contain conventional additives and auxiliaries, such as lubricants, antiblocking agents and antistatic agents, in the conventional quantities. Thus, it is possible to use unsaturated fatty acid amides, saturated fatty acid amides, such as stearic acid amide, erucic acid amide, thermoplastic polymers which are incompatible with the LLDPE of the heat sealing layer, such as polyamide-12, inorganic antiblocking agents or antistatic compounds, such as long-chain aliphatic tertiary amines, which may optionally be monounsaturated, such as ethoxylated tertiary amines, for example a N,N-bis-(hydroxyethyl)($C_{12}$-$C_{16}$)-alkylamine.

The multilayer films according to the present invention may be produced by conventional methods, such as lamination, coating or melt (co)extrusion, the combination of which the heat sealable layer consists being obtainable by the master batch technique, but preferably by direct compounding.

Any stretching in the longitudinal direction should be carried out in a ratio of from 5:1 to 7:1 and in the transverse direction in a ration of from 7:1 to 10:1. The ratio of the film density after stretching to the film density before stretching should generally reach at most 0.9.

The multilayer film according to the present invention should preferably have a thickness of from 20 to 80 μm, of which each heat sealable layer sould have a thickness of preferably from 0.8 to 2 μm, more preferably of 1 μm.

By virtue of the excellent processing properties thereof in high-speed packaging machines and, in particular, by virtue of the low sealing temperature thereof, the opaque multilayer films according to the present invention are particularly suitable for use as packaging material, more especially for foods and confectionery, and to this end may be printed and provided with tear-open strips.

In the following Examples, the follwing test methods were used for determining the film properties.

The gloss of the film was determined using a photoelectric gloss meter after Dr. B. Lange, Berlin, consisting of a low-voltage bulb and a condenser, which illuminate the specimen at 45°, and a second section, at 45° to the measuring plane, with a pinhole diaphragm and a photocell. The gloss meter is connected to a finely adjustable indicating instrument (microammeter) which, in addition, contains the power supply and voltage stabilizer for the bulb.

The gloss is defined as the proportion of light normally reflected at 45° in %, based on a surface-silvered mirror as 100% standard. In the gloss test, a polished black glass plate is mounted on the gloss meter as an intermediate standard because the silver mirror standard is not tarnish-resistant in air. It has exactly 5% of the gloss of a surface-silvered mirror. Accordingly, the galvanometer reading of the photocell of the floss meter is adjusted through the black glass intermediate standard in order to increase the accuracy of reading of the scale graduation by the control potentiometer. The film to be tested is placed flat under the gloss meter on matt-black photographic papers transversely of the direction of travel, based on the optical axis of the gloss meter, and is measured at five satisfactory places. The galvanometer reading is divided by 10 and the average value is determined.

To determine the strength of the sealing seams, sealing strength is tested under a low sealing pressure. Sealing strength is to be understood to be the force required to separate a sealing seam formed under defined conditions (0.35 N/cm$^2$, 0.5 sec. and the temperatures indicated in the Table). The sealing strength is expressed in Newtons and is based on a 15 mm wide test strip.

EXAMPLES 1 TO 4

To produce an opaque multilayer film a heat-sealable combination of 0.5%, by weight of polydimethylsiloxane having a kinematic viscosity of $10^6$ mm$^2$/second, 0.5%, by weight of a 1:1 mixture of polyethylene wax and an oxazoline wax, 0.15%, by weight of a thermoplastic polyamide-12 as antiblocking agent, 0.2%, by weight of stearic acid amide, 0.2%, by weight of erucic acid amide and 0.5%, by weight of N,N-bis-(2-hydroxyethyl)-($C_{12}$–$C_{16}$)-alkylamine and the percentages, by weight, indicated in the following Table of a low molecular weight, hydrogenated polycyclic hydrocarbon resin based on cyclopentadiene (EXCOREL ®5000) and a linear statistical ethylene copolymer which contains approximately 4 mol-% of copolymerized octene units and which has a density of 0.911 g/cm³ is prepared and combined by conventional methods on both surfaces of a base film polypropylene (density 0.905 g/cm³, melt index 3.3 g/10 mins., at 230° C./21.6N; melting range 160°–166° C.) which contains 12% by weight of $CaCO_3$ fine dispersed, and orientated longitudinally in a ratio of 5:1 and transversely in a ratio of 10:1 whereby a opaque multilayer film with a thickness 1 μm/38 μm/1 μm is obtained.

|  | Example 1 | Example 2 | Example 3 | Example 4(*) |
|---|---|---|---|---|
| LLPDE (%, by weight) | 95 | 90 | 80 | 100 |
| Hydrocarbon resin (%, by weight) | 5 | 10 | 20 | — |
| Gloss (GU) | 44,5 | 45,5 | 46 | 44 |
| Low-pressure sealing Sealing strength (N/15 mm) | | | | |
| 85° C. | 1.5 | 1.6 | 2.0 | 0 |
| 90° C. | 1.8 | 2.1 | 2.2 | 0.7 |
| 100° C. | 2.1 | 2.2 | 2.5 | 1.3 |
| 110° C. | 2.2 | 2.2 | 2.6 | 1.8 |

(*)Comparison Example

We claim:

1. An opaque, heat-sealable multilayer film which comprises a biaxially-oriented base layer comprising a polymer of propylene and optionally up to 10%, by weight, of at least one α-olefin containing up to 8 carbon atoms from 3 to 15%, by weight, of at least one additive incompatible and fine dispersed therewith, and at least one at least monoaxially-oriented heat-sealable layer comprising:
   (a) from 66.5 to 94.5%, by weight, of a linear, statistical ethylene copolymer (LLDPE) having a low density;
   (b) from 5 to 30%, by weight, of a low molecular weight resin compatible with (a), except a low molecular weight polyolefin resin of a α-olefin with at most 3 C atoms;
   (c) from 0.3 to 2%, by weight, of a mixture of a polyethylene wax and an oxazoline wax;
   (d) from 0.2 to 1.5%, by weight, of polydiorganosiloxane.

2. A film as claimed in claim 1 wherein the heat sealable layer comprises: from 78 to 89.1%, by weight, of (a); from 10 to 20%, by weight, of (b); from 0.5 to 1%, by weight, of (c); and from 0.4 to 1%, by weight, of (d).

3. A film as claimed in claim 1 wherein the base layer comprises from 8 to 12%, by weight, of incompatible additives having an average particle size from 0.2 to 20 μm.

4. A film as claimed in claim 1 wherein at least one of conventional additive or auxiliarie is present as component (e).

5. A film as claimed in claim 1, wherein component (a) is a copolymer of ethylene and up to 12 mol%, of $C_3$–$C_{10}$ α-olefins having a density from 0.900 to 0.940 g/cm³.

6. A film as claimed in claim 5, wherein the $C_3$–$C_{10}$ α-olefin of component (a) is selected from the group of propylene, 1-butene, pentene, hexene, octene, nonene, decene or 4-methyl-1-pentene.

7. A film as claimed in claim 1, wherein as component (b) is a natural or synthetic resin having a softening point of from 60° to 180° C.

8. A film as claimed in claim 7, wherein the natural or synthetic resin is selected from rosin, dammar resins, turpentine resins, hydrocarbon resins, ketone resins, phenolic resins, chlorinated aliphatic or aromatic hydrocarbon resins.

9. A film as claimed in claim 1, wherein as component (c) a mixture of a polyethylene wax and an oxazoline wax prepared from stearic acid and an amino alcohol, preferably tris-hydroxymethylaminomethane, is used.

10. A film as claimed in claim 1, wherein the base layer contains as incompatible additives of an inorganic additive selected from the group of $CaCO_3$, $SiO_2$, Na—Al silicate and $TiO_2$.

* * * * *